United States Patent Office 3,395,104
Patented July 30, 1968

3,395,104
PROMOTED CATALYST USED FOR TOWN GAS PRODUCTION
William F. Taylor, Scotch Plains, and John H. Sinfelt, Berkeley Heights, N.J., assignors to Esso Research and Engineering Company, a corporation of Delaware
No Drawing. Filed Dec. 3, 1963, Ser. No. 327,840
The portion of the term of the patent subsequent to Dec. 1, 1984, has been disclaimed
3 Claims. (Cl. 252—466)

ABSTRACT OF THE DISCLOSURE

A catalyst consisting essentially of an interspersion of nickel oxide and aluminum oxide containing an atom ratio of nickel to aluminum of 0.4 to 1.5 with yttrium oxide added as a promoter in an atom ratio of yttrium to nickel in the range of 0.01 to 1.0 has high resistance to loss in activity when used as a Town Gas catalyst insofar as this catalyst has the specified proportions of compounds and is prepared under specific conditions to give the catalyst a high surface area.

---

This invention relates to a yttrium promoted nickel-alumina catalyst of high-nickel content and high-surface area and which is highly active in the production of methane-rich fuel gas or town gas by reaction of hydrocarbons, principally paraffins, having 5 to 8 carbon atoms per molecule with stream at low reaction temperatures in the range of 600° to 925° F.

Nickel catalysts having nickel on a refractory support or carrier, such as magnesia, kaolin or china clay (alumina silicates), or alumina, both with and without alkali metal or alkaline earth metal oxides as promoters, are known to be used for reacting $C_1$ to $C_4$ paraffins with steam at temperatures above 1000° F. to produce mainly hydrogen and oxides of carbon. Such a high-temperature reaction is endothermic. The catalysts exposed to high-temperatures and used for such high-temperature processes have been of the type which have a porous carrier impregnated by a relatively minor proportion of nickel and which have a low surface area. The same types of nickel catalysts have been described as suitable for steam reforming of higher hydrocarbons to produce methane with hydrogen and oxides of carbon at lower temperatures, up to 1000° F., but no tests were reported to show whether such catalysts are able to exhibit high activity at low reaction temperatures, i.e. below 925° F., and whether they are able to maintain their activity at low temperatures for a sufficiently long period to make their use practical.

Difficulties were encountered in making comparative tests of activity and activity maintenance when conventional methods of forming the catalyst were used and the resulting catalyst was found to be difficult to reproduce. In the operation of a high-activity catalyst for use under relatively low temperature reaction conditions, the control of operation conditions is important.

In accordance with the discoveries of the present invention, a high-nickel content, high-surface area, nickel-alumina catalyst with a yttrium promoter is prepared by a coprecipitation technique using a precipitant, such as ammonium bicarbonate, for coprecipitating nickel and aluminum as the hydroxides, carbonates or basic carbonates, admixing the yttrium compound, preferably nitrate, with the precipitate, then treating the resulting mixture under controlled conditions of drying, and calcining in air after which the catalyst may be stored and be activated by reduction with hydrogen when ready for use.

There is accumulated evidence that the interaction of the nickel and the aluminum coprecipitate is important regardless of the use of any promoting compound, and that it is also important to control drying and calcination temperatures. In order to obtain maximum and reproducible activity, the drying is carried out at 200° to 400° F. and the calcining in air is carried out at 600° to 925° F. The activation of the catalyst by treatment with hydrogen is carried out at 600° to 925° F. Thus, it is important to avoid exposure of the catalyst to higher temperatures, i.e. above 925° F., especially in the presence of an oxidizing gas, e.g. air or steam, which tends to cause rapid deterioration as indicated by lower surface area.

The compounds of nickel and aluminum, which are coprecipitated, may include the hydroxides, carbonates and basic carbonates and the coprecipitation is preferably effected in an aqueous salt solution. Preferably the nitrates of nickel and aluminum are heated to a temperature in the range of 32° to 212° F. or to the boiling point of the solution. By using the nitrate solution of nickel and of aluminum and ammonium bicarbonate as a precipitant, no washing of the precipitate is required, and the final calcined metal oxides are particularly free of contaminating agents because the nitrate, ammonium carbonates, and hydroxides are decomposed to leave the metal oxides. Thus, likewise, the promoting metal is added in the form of a nitrate to the coprecipitated nickel and aluminum compounds prior to drying and calcining in air. With the procedure described of coprecipitating nickel and aluminum compounds, then admixing the salt of the promoter, the resulting calcined catalyst is given a controlled composition, and the metal compounds are interspersed, i.e., each distributed among the others.

The calcined material may contain an atom ratio of nickel to aluminum ranging from 0.4 to 1.5 and the atom ratio of yttrium to nickel may be in the range of 0.001 to 1.0. The calcined catalyst particles, screened to a desired size, e.g. 0.5 to 5 mm., when given the final activation by treatment with hydrogen, preferably at 600° to 925° F. will then contain the reduced nickel. The activation may be carried out under a hydrogen pressure of one atmosphere or above. and the reduction treatment may be carried out after the catalytic reactor is loaded with calcined particles.

In the low-temperature reaction of steam with vapors of low-boiling normally liquid naphtha hydrocarbons using the catalyst to produce a gas rich in methane, the hydrocarbon vapor and steam may be preheated to a temperature above 600° F. and to such a temperature as to maintain a suitable reaction temperature, preferably in the range of about 600° to 925° F., in the reaction zone where the hydrocarbon vapor and steam are contacted with the catalyst. Generally, the proportion of steam is about 1.5 to 5 parts by weight for one part by weight of hydrocarbon, preferably 1.8 to 2.5 parts $H_2O$ per part of hydrocarbons on a weight basis. The pressure in the reaction zone may be in the range of 1 to 70 atmospheres or higher, preferably higher than 10 atmospheres, since at the higher pressure carbon formation is reduced to a point where little carbon is produced over long periods of time.

By having the temperature of reaction between the steam and the hydrocarbon vapor sufficiently low and the pressure sufficiently high, the content of methane in the gas product is increased. A desirable fuel gas product should generally contain more than 50% of methane on a water free basis. The concentration of methane can be increased by removal of carbon dioxide and water. Studies have shown that it is desirable to keep the activated catalyst at as low a reaction temperature as possible during the reaction of the hydrocarbon with steam, because deactivation or lowering of the surface area is increased as the temperature is elevated. The deactivation may result from oxidation of the nickel by steam and sintering as the temperature is raised substantially above 700° F. and particularly above 925° F. It is also desirable to prevent contamination of the catalyst by substances which poison the catalyst such as sulfur-containing compounds. Therefore, the hydrocarbon feed should contain a low amount of sulfur, e.g. less than 15 p.p.m.

The methane-rich gas product obtained through the low temperature reaction of the naphtha hydrocarbons with steam may be used for diluting other fuel gases such as natural gas, or gas containing carbon monoxide and hydrogen. It may be used as fuel gas or town gas by itself because it has sufficient high calorific content.

In the low temperature catalytic reaction of the hydrocarbons with steam to form methane, the net heat of reaction is generally exothermic so there is no need to supply heat to the reactor other than sensible heat of the hydrocarbon feed, and steam may be introduced into the reaction zone at a temperature below the reaction temperature.

Details on the preferred methods of preparing the yttrium promoted nickel-alumina catalyst, for testing the catalyst and using the catalyst are given in the following examples.

Example 1.—Preparation of Ni-Al$_2$O$_3$ yttrium catalyst

Add 740 g. of Al(NO$_3$)$_3$·9H$_2$O and 750 g. of

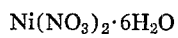

Ni(NO$_3$)$_2$·6H$_2$O to 3 liters of deionized water. Stir the solution and bring the solution to 120° F. Add 1040 g. of NH$_4$HCO$_3$ to the solution while stirring and adding enough heat to maintain the slurry at 120° F. After the precipitation is complete continue stirring while maintaining the slurry at 120° F. for an additional 2 hours. Remove part of the water from the slurry so that a wet paste remains. Add 60 g. of yttrium nitrate Y(NO$_3$)$_3$·6H$_2$O dissolved in a little deionized water to the catalyst paste and mix well. Dry the catalyst overnight at 230° F. and then calcine in air in an oven for 4 hours at 750° F. The calcined catalyst thus prepared had a N$_2$ B.E.T. surface area of 174 m.$^2$/g. and analyzed 43.4 wt. percent nickel by wet chemical analysis.

A number of tests have provided that it is desirable to effect the coprecipitation of the nickel and aluminum compounds at a temperature in the range of 32° to 212° F. or the boiling point of the salt solution and slurry. The precipitate separated from the excess solution should be dried preferably in the range of 200° to 400° F. which may be done for several hours. The yttrium promoter is added to the wet precipitate prior to drying and mixed well with the precipitate in the form of a paste. The calcination that follows the drying should be within the range of 600° to 925° F. in the presence of oxygen-containing gas or air for a period of about 1 to 10 hours. After the calcination the solid catalyst of a desirable suitable size can be separated by screening or the catalyst particles can be pressed or formed into any desired shape.

Example 2.—Test of yttrium promoted Ni-Al$_2$O$_3$

The catalyst prepared in Example 1 was tested for the town gas reaction as follows: the catalyst was first pre-reduced with H$_2$ at 700° F. and 25 p.s.i.g. for 10 hours. Then 11.2 lbs. of 95% n-hexane per hour per pound of catalyst was passed over the catalyst at 700° F. (temperature of the lead bath into which the reactor and preheater was immersed) and 500 p.s.i.g. along with 2 lbs. of water per pound of hydrocarbon. The activity of the catalyst was measured as standard cubic feet of product gas produced per hour per 250 cc. of hydrocarbon feed.

The activity of the catalyst as a function of time on feed was as follows:

| Hours on feed: | Activity |
| --- | --- |
| 16 | 2.44 |
| 30 | 2.45 |
| 40 | 2.42 |
| 50 | 2.37 |
| 58 | 2.32 |
| 68 | 2.35 |
| 75 | 2.35 |

The initial activity of a yttrium promoted catalyst over the first 50 hours is lower than an unpromoted catalyst. However, an unpromoted catalyst loses activity rapidly so that its long term activity is less than that of a yttrium promoted catalyst. This is particularly important since a catalyst life in excess of 1000 hours is desired.

The following data were obtained on the conversion and composition of the gas product:

| Hours on feed | 24 to 36 | 36 to 48 |
| --- | --- | --- |
| Percent Feed conversion | 22.6 | 21.2 |
| Gas composition, mole percent (dry basis with C$_2$+ material and all but 2% CO$_2$ removed): | | |
| CH$_4$ | 50.93 | 49.83 |
| H$_2$ | 46.62 | 47.93 |
| CO | .45 | .24 |
| CO$_2$ | 2.00 | 2.00 |
| Heating value, B.t.u./s.c.f. (dry, no C$_2$+ and with all but 2% CO$_2$ removed) | 665 | 657 |

The tests that have been conducted show the yttrium promoted nickel-aluminum catalysts are able to resist loss in activity much better than other catalysts that have so far been tested.

The invention described is claimed as follows:

1. A catalyst of high activity and activity maintenance for producing methane by reaction of C$_5$ to C$_8$ paraffins with steam at 600° to 925° F. when the catalyst is activated by treatment with H$_2$ at 600° to 925° F., consisting essentially of an interspersion of nickel oxide and aluminum oxide containing an atom ratio of nickel to aluminum in the range of 0.4 to 1.5, said interspersion being obtained by coprecipitating nickel and aluminum compound of the class consisting of hydroxides, carbonates and basic carbonates, drying the coprecipitate at 200° to 400° F. and calcining the dried coprecipitate in air at 600° to 925° F., and yttrium being present as an oxide in said interspersion in an atom ratio to the nickel in the range of 0.001 to 1.0 by addition of an yttrium compound to the coprecipitate before the drying and calcining of the coprecipitates so that the resulting calcined interspersion of nickel oxide and aluminum oxide contains yttrium oxide and is substantially free of other components.

2. A catalyst of high activity and activity maintenance for producing methane by reaction of C$_5$ to C$_8$ paraffins with steam at 600° to 925° F. when the catalyst is activated by treatment with H$_2$ at 600° to 925° F., consisting essentially of an interspersion of nickel oxide and aluminum oxide containing an atom ratio of nickel to aluminum in the range of 0.4 to 1.5, said interspersion being obtained by coprecipitating nickel and aluminum compounds of the class consisting of hydroxides, carbonates and basic carbonates, drying the coprecipitate at 200° to 400° F. and calcining the dried coprecipitate in air at 600° to 925° F., and yttrium being present as an oxide in said interspersion in an atom ratio to the nickel in the range of 0.001 to 1.0 by addition of an yttrium compound to the coprecipitate before the drying and calcining of the coprecipitate so that the resulting calcined interspersion of nickel oxide and aluminum oxide contains yttrium oxide and is substantially free of other components, said catalyst having a surface area of 174 m.$^2$/g. when containing 43.4 wt. percent nickel.

3. The catalyst of claim 2 wherein said yttrium compound is yttrium nitrate.

References Cited

UNITED STATES PATENTS

| | | | |
|---|---|---|---|
| 2,119,566 | 6/1938 | Williams | 252—466 XR |
| 2,449,295 | 9/1948 | Gutzeit | 252—466 |
| 3,179,488 | 4/1965 | Appell | 23—2.2 |
| 3,202,618 | 8/1965 | Jaffe | 23—2.2 |
| 3,216,954 | 11/1965 | Howk, et al. | 252—465 |

FOREIGN PATENTS 820    9/1959    Great Britain.

DANIEL E. WYMAN, *Primary Examiner.*

L. G. MANDONI, *Assistant Examiner.*